(12) United States Patent
Hsueh et al.

(10) Patent No.: US 7,328,836 B2
(45) Date of Patent: Feb. 12, 2008

(54) SMART TAG HOLDER AND COVER HOUSING

(75) Inventors: Tsung-Chih Hsueh, Jhudong Township, Hsinchu County (TW); Ying-Cheng Chen, Chubei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 5 days.

(21) Appl. No.: 10/771,489

(22) Filed: Feb. 3, 2004

(65) Prior Publication Data

US 2005/0167492 A1 Aug. 4, 2005

(51) Int. Cl.
*G06F 17/00* (2006.01)
(52) U.S. Cl. .................... 235/375; 414/217.1
(58) Field of Classification Search ........... 235/380, 235/375, 376, 381; 414/217, 935, 937, 938, 414/939, 940, 217.1; 198/341, 349
See application file for complete search history.

(56) References Cited

U.S. PATENT DOCUMENTS

| | | | |
|---|---|---|---|
| 4,500,080 A * | 2/1985 | Aigo ........................... 269/56 |
| 4,974,166 A | 11/1990 | Maney et al. ............... 364/478 |
| 5,097,421 A | 3/1992 | Maney et al. ............... 364/478 |
| 5,166,884 A | 11/1992 | Maney et al. ............... 364/468 |
| 5,482,161 A * | 1/1996 | Williams et al. ............ 206/711 |
| 5,628,683 A * | 5/1997 | Gentischer .................. 454/187 |
| 5,669,508 A * | 9/1997 | Chen et al. .................. 206/710 |
| 5,740,845 A * | 4/1998 | Bonora et al. .............. 141/292 |
| 5,810,537 A * | 9/1998 | Briner et al. ............ 414/217.1 |
| 5,980,183 A | 11/1999 | Fosnight ................. 414/222.01 |
| 6,074,154 A * | 6/2000 | Ueda et al. .................. 414/217 |
| 6,095,335 A * | 8/2000 | Busby ......................... 206/711 |
| 6,098,809 A * | 8/2000 | Okada et al. ................ 206/711 |
| 6,152,669 A * | 11/2000 | Morita et al. ............... 414/217 |
| 6,164,530 A * | 12/2000 | Cheesebrow et al. ....... 235/380 |
| 6,536,592 B1 * | 3/2003 | Chang et al. ............. 206/459.1 |
| 6,558,962 B2 | 5/2003 | Nishiki .......................... 438/5 |
| 6,579,052 B1 | 6/2003 | Bonora et al. ......... 414/222.01 |
| 2002/0021009 A1* | 2/2002 | Smith et al. ................ 292/145 |

* cited by examiner

*Primary Examiner*—Ahshik Kim
(74) *Attorney, Agent, or Firm*—Duane Morris, LLP

(57) ABSTRACT

A smart-tag housing and method for securing a dedicated data card affixed to a SMIF-pod. A molded housing package for holding a data card for communication with a two-way receiver/transmitter mounted on a workstation, the smart-tag is a small battery operated microcomputer with an LCD for a two-way electro-magnetic communications. The smart-tag housing includes a battery compartment, a battery compartment cover. A retaining plate is affixed to a side of the pod using double-sided adhesive tape. The smart-tag is demountably secured to the retaining plate with a slidable self locking plate. The self locking plate is unlocked with a key that is provided only to authorized personnel.

20 Claims, 4 Drawing Sheets

FIG. 1 – Prior Art

SMART TAG HOLDER AND COVER HOUSING

BACKGROUND OF THE INVENTION (1) Technical Field

This invention is concerned with improvements to standardized mechanical interface systems used for reducing particle contamination on semiconductor substrates, and more particularly to a smart tag holder and tag cover housing used with a standardized mechanical interface and pod carrier.

(2) Description of the Prior Art

Protecting fragile objects such as, for example, a plurality of semiconductor substrates held in cassettes are further contained in a mini-environment also known as a pod, a transportable carrier. In general, a pod arrangement for isolating fragile objects from external environmental conditions is acknowledged. In such an application, a pod enclosing a cassette in a small volume of motionless, particle free space is considered the cleanest achievable surroundings for protecting the surfaces of semiconductor substrates from particulates and gases. Total isolation is provided during transport, storage and processing of these substrates.

Referring to FIG. 1, of the prior art, a process station 50 for processing semiconductor substrates is shown. A particular processing line, such as photolithography, may include any number of stations as the type of station shown in FIG. 1. The stations are designed to provide processing steps such as applying photo resist materials on substrates, mask alignment for actinic exposure of the photo resist, material deposition on the semiconductor substrates, etc.

FIG. 1 also illustrates the transportable carrier pod 20 above the workstation 50 after being removed from an engaging guide tray 53. The pod shelters a cassette 30 that holds a plurality of semiconductor substrates, the cassette is shown unloaded from the pod and in the process station 50. In practice, the pod would remain engaged in the tray until all the substrates in the cassette were processed, and the cassette put back into the pod. This illustration was done to simplify the following description.

The pod 20 is removably placed on the canopy 54 of the processing station 50. An engaging guide tray 53 aligns and seals the pod cassette port 22 disposed at the bottom of pod 20 over a canopy of the process equipment. A smart-tag 40 is affixed to pod 20 to interact with a two-way communication means mounted on the workstation. The cassette passes into the process station by way of a pass-through door 52 at the base of pod alignment tray, with door 53 on the interface ports on the canopies preserving the respective environments. Latches for the two doors are opened simultaneously so that any contaminants on the surfaces of the outer doors are trapped between the doors, accordingly, preserving the clean environments of both pod and canopy into an integrated clean space. A mechanism lowers the two doors with the cassette. Latches release the pod door and the interface port simultaneously. An elevator mechanism lowers the two doors with the cassette riding on top into the canopy-covered space. A robot picks up the cassette and places it into the cassette port within the equipment. After processing, the reverse operation is carried out.

Standardized mechanical interface (SMIF) systems including pods are provided with inventory management hardware and software that can monitor the status of semiconductor substrates between process operations. A smart tag is a major interface for the SMIF pod system. A pod identification tag is mounted to the pod. The smart tag carries an updated status of the pod's inventory and communicates with all the SMIF systems, verifying therein, sequential correctness for further processing while also communicating with an operator assigned to a particular operation. The smart tag is used as part of a distributed processing system that does not require centralized control. Instead, a tag associated with the pod can store processing data pertaining to the particular substrates, and can perform calculations necessary to properly process the substrates.

The smart tag permits mobility in work-in-progress management and lot tracking. It is the intellectual component that provides sequential processing, process control, and storage/retrieval for the product. It is battery powered, stores 192 bytes of data which includes, lot identification, status of work-in-progress, process number, work area, and a cleaning schedule. However, the smart tag, as significant as it appears, has major drawbacks causing many quality issues under daily operation and use as outlined in the following list.

1. Missing Lot: Memory loss caused by shortage of battery power. This problem manifests itself by an alarm at the SMIF arm or, by confusing the stocker storage and retrieval access. This problem may occur many times in the same workday.

2. Data failure rate: This is another side effect from battery power shortage, especially during the load/unload activities. Additionally, an out of position tag on the pod relative to the infrared reader gives false data transfer information. This problem occurs often, typically about 12 times daily for an average of 250K transfers.

3. Repair rate: This can be the most critical issue with the present tag. Many tags executed data error because of chip decay or from damage caused by physical impact.

4. Tag reject rate: The present repair and maintenance salvaged seventy percent of the tags. Because of damaged LCD or chip the remaining thirty-percent had to be scraped.

5. Pod management: One tag, one pod rule is essential for pod management. This also organizes pod cleaning. When the cleaning due date is forthcoming, each pod/cassette will be cleaned prior to wafer start.

Another disadvantage with the prior art is the lost production time when the above problems occur. Debug and repair and maintenance affects production rate.

SUMMARY OF THE INVENTION

The present invention has been accomplished in view of the above mentioned problems. It is therefore a primary object of the present invention to prevent loss of production tracking and work-in-progress records held in memory by the SMIF smart-tag that is mounted on the pod.

It is another object of the invention to improve tag to pod mounting methods. The screws that secure the metal tag holder, of the prior art, loosen causing movement of the tag. This results in the reader relaying disordered information from a skewed tag. Therefore, an improved tag holder, of the invention, is provided for ease of mounting, with a lock having a special key for removal.

It is still another object of the invention, to prevent the tag from falling off the Pod and become damaged.

It is yet another object of the invention to provide a battery holder that makes it easier to replace batteries.

These objects have been achieved by a design modification to the smart-tag holder packaging. These and further constructional and operational characteristics of the invention will be more evident from the detailed description given hereafter with reference to the figures.

DETAILED DESCRIPTION OF THE PREFERRED EMBODIMENT

Safeguarding against erroneous processing of semiconductor substrates, identification and tracking using advanced robotics to create ultra-clean processing environments, has become an essential ingredient when forming highly integrated circuits on larger substrates.

A plurality of semiconductor substrates held in cassettes is further contained in a mini-environment also known as a pod, a transportable carrier. In general, a pod arrangement for isolating fragile objects from external environmental conditions is acknowledged. In such an application, a pod enclosing a cassette in a small volume of motionless, particle free space is considered the cleanest achievable surroundings for protecting the surfaces of semiconductor substrates from particulates and gases. Total isolation is provided during transport, storage and processing of these substrates.

Figure 1:
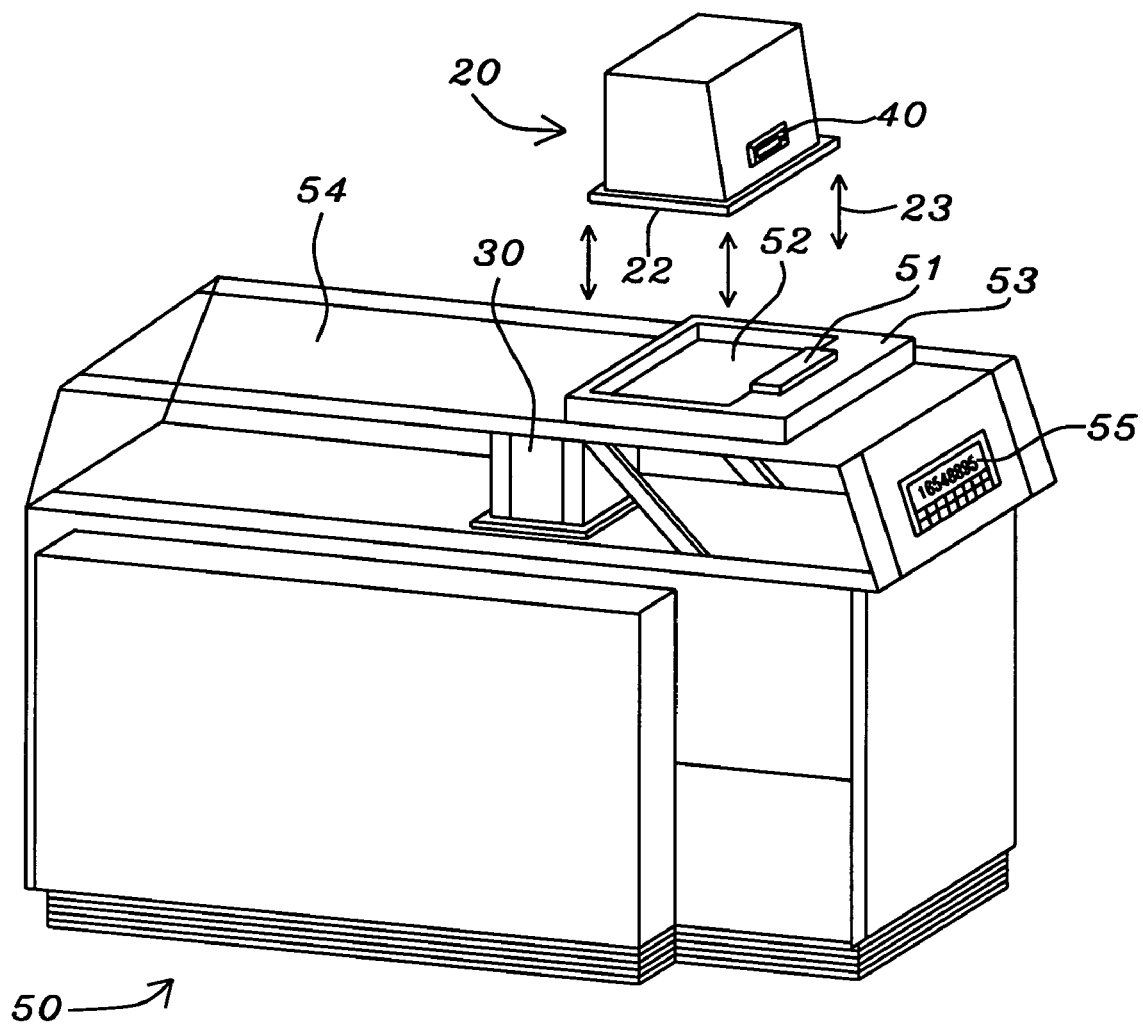
FIG. 1 shows a perspective view of a modular SMIF system, of the prior art, integrated into processing equipment.

FIG. 1 illustrates a transportable carrier pod 20 shown over an engaging guide tray 53 of a canopy 54. The pod shelters a cassette 30 that holds a plurality of semiconductor substrates, the cassette is shown unloaded from the pod and in the controlled environment within processing work station 50. In practice, the pod 20 would remain engaged in the tray until all the substrates in the cassette were processed, and the cassette put back into the pod thereby preserving the clean environment. This was illustrated in FIG. 1 to simplify the description that follows.

The pod 20 is removably engaged on a canopy 54 of the workstation 50 shown by directional arrows 23. An engaging guide tray 53 aligns and seals the pod cassette port 22 disposed at the bottom of pod 20 over a canopy pass-through door 52 to the work station 50. A smart-tag 40 is affixed to pod 20 to interact with a two-way communication means 51 mounted on the work station canopy. A metal plate is mounted to the back of the smart-tag with screws and the plate with attached smart tag 40 is mounted to pod 20 with screws. The cassette 30 passes into the process station by way of a pass-through door 52 at the base of pod alignment tray, with door 53 on the interface ports on the canopies preserving the respective environments. Latches for the two doors are opened simultaneously so those any contaminations, which may have been on the outer door surfaces, are trapped between the doors, so that the spaces in the pod and the canopy become integrated clean spaces. A mechanism lowers the two doors with the cassette 30. Latches release the pod door and the interface port simultaneously. An elevator mechanism lowers the two doors with the cassette riding on top into the canopy-covered space. A robot picks up the cassette and places it into a cassette port inside the equipment. After processing, the reverse operation is carried out.

Standardized mechanical interface (SMIF) systems including pods are provided with inventory management hardware and software that can monitor the status of semiconductor substrates between process operations. The pod 20 with smart tag 40 displays an identification number. The pod identification number is the major interface for the SMIF pod system. The smart-tag carries an updated status of the pod's inventory and communicates with all the SMIF systems, verifying therein, sequential correctness for further processing while also communicating with an operator, assigned to a particular operation, by way of an interactive display terminal 55. The smart-tag is used as part of a distributed processing system that does not require centralized control. Instead, a smart-tag associated with the pod can store processing data pertaining to the particular substrates held within cassette 30, and can perform calculations necessary to properly process the substrates.

The smart-tag allows work-in-progress management and lot tracking. The smart-tag is the accounting component that provides sequential processing, process control, queuing and storage/retrieval for the product. It is battery powered stores 192 bytes of data, which includes, lot I.D., status, process number, work area, and a cleaning schedule. Functional accountability for work-in-progress management and lot tracking relies heavily on its battery power. Batteries are difficult to remove and costly to replace. Battery failure rate is high. Power lifetime is reduced due to power leakage and other interconnection difficulties. Damage to the smart-tag screen that often occurs when mounting screws loosens. Pod damage happens when an operator forcedly attempts to remove a tag.

Figure 2:
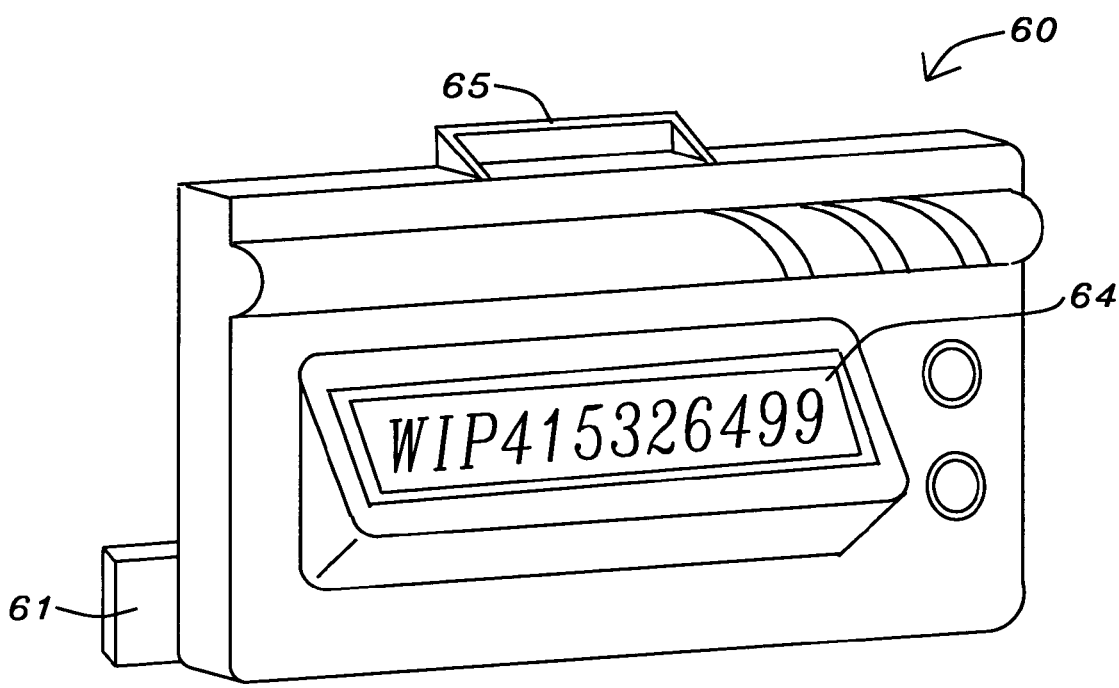
FIG. 2 is a perspective drawing showing a front view of a smart tag according to the invention
Figure 3:
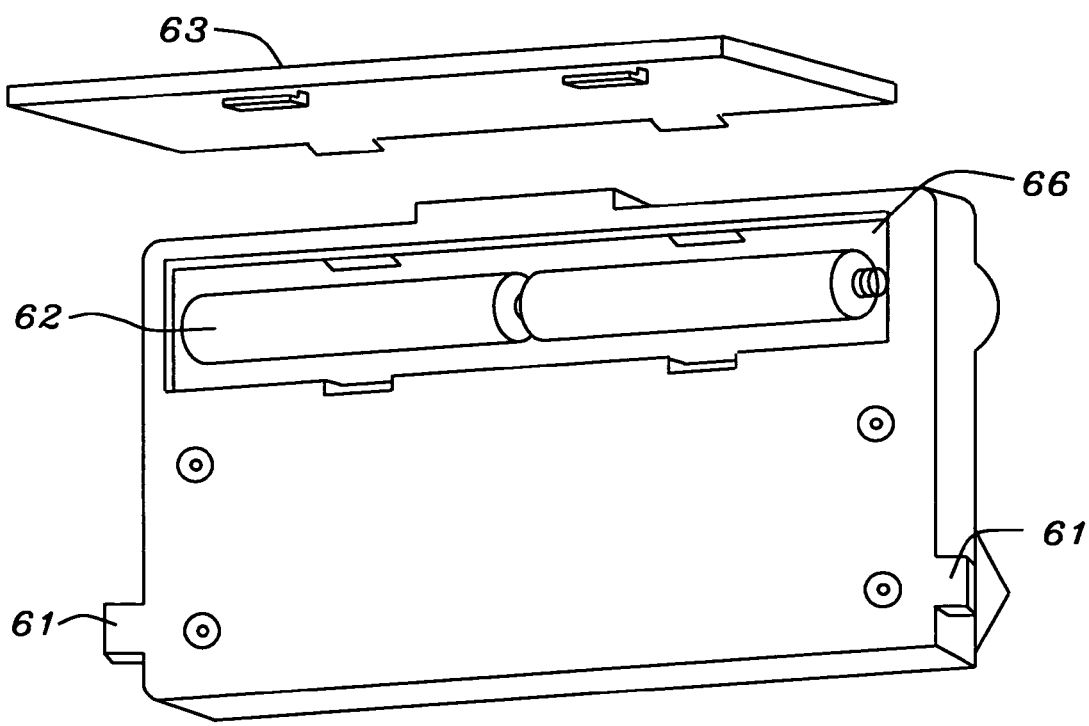
FIG. 3 is a perspective drawing showing the back view of a smart tag according to the invention.

FIGS. 2-5 illustrate the improvements that were made to reduce the problems described in the previous paragraph. FIG. 2 illustrates a front view of a smart-tag package 60 showing an interlocking recessed portion 65 formed on the top side to be used for securing the smart-tag to the pod, and a display 64 disposed to interact with a two-way communication means. Two rest pads 61 are provided to hold the smart-tag package against an interface structure 74 shown in FIG. 4. FIG. 3 illustrates the backside of the smart tag. Batteries 62 are inserted within a pocket cavity 66 and easily accessible to remove and replace spent batteries by removing a snap-on compartment cover 63.

Figure 4:
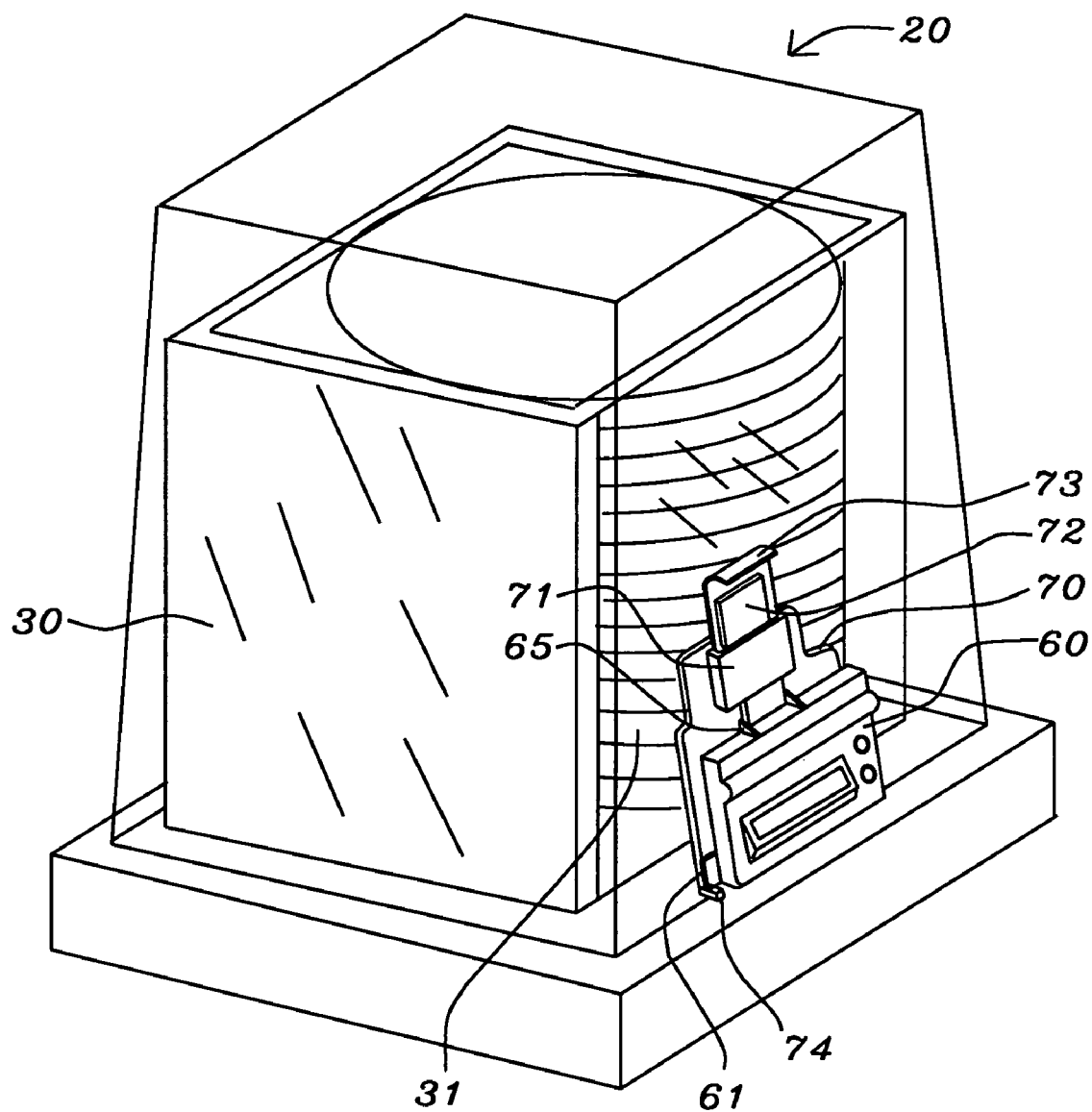
FIG. 4 is a perspective view schematically showing a SMIF pod with a dedicated smart tag according to the invention.

FIG. 4 shows a pod 20 containing semiconductor substrates 31 in a cassette 30 with an attached interface plate 70 for removeably mounting a smart tag. The interface plate 70 having a guide bearing housing 71 and two receiving pads 74. The backside of the interface plate is mounted to the pod 20 with double-sided adhesive tape. (The adhesive held after seventy pod cleaning cycles, amounting to more than five years of usage and exceeded lifetime expectancy.) The smart-tag 60 is positioned against the front side of the interface plate 70 so that the two rest pads 61 are supported and retained by the two receiving pads 74. A slideable bar-lock 72, guided by guide bearing housing 71, is urged downward to interlock with recessed portion 65 located on the top surface of the smart tag 60. An additional wedge plate 73 is forced downward preventing the bar-lock from becoming loose. Only assigned personnel remove the wedge plate.

Additional tests were conducted for the new package design. The following tests were completed and proved successful. Pull strength of greater than 10 kgs was recorded, and a drop test was successfully performed in accordance with IEEE-488 standard. Other noteworthy tests included; fire prevention, on-line testing (acceptable distance between transmission and receiving measured at 30 mm), and outside dimension measurement showing no change. The results, therefore, of all the tests were positive according to stringent acceptance criteria.

Figure 5:
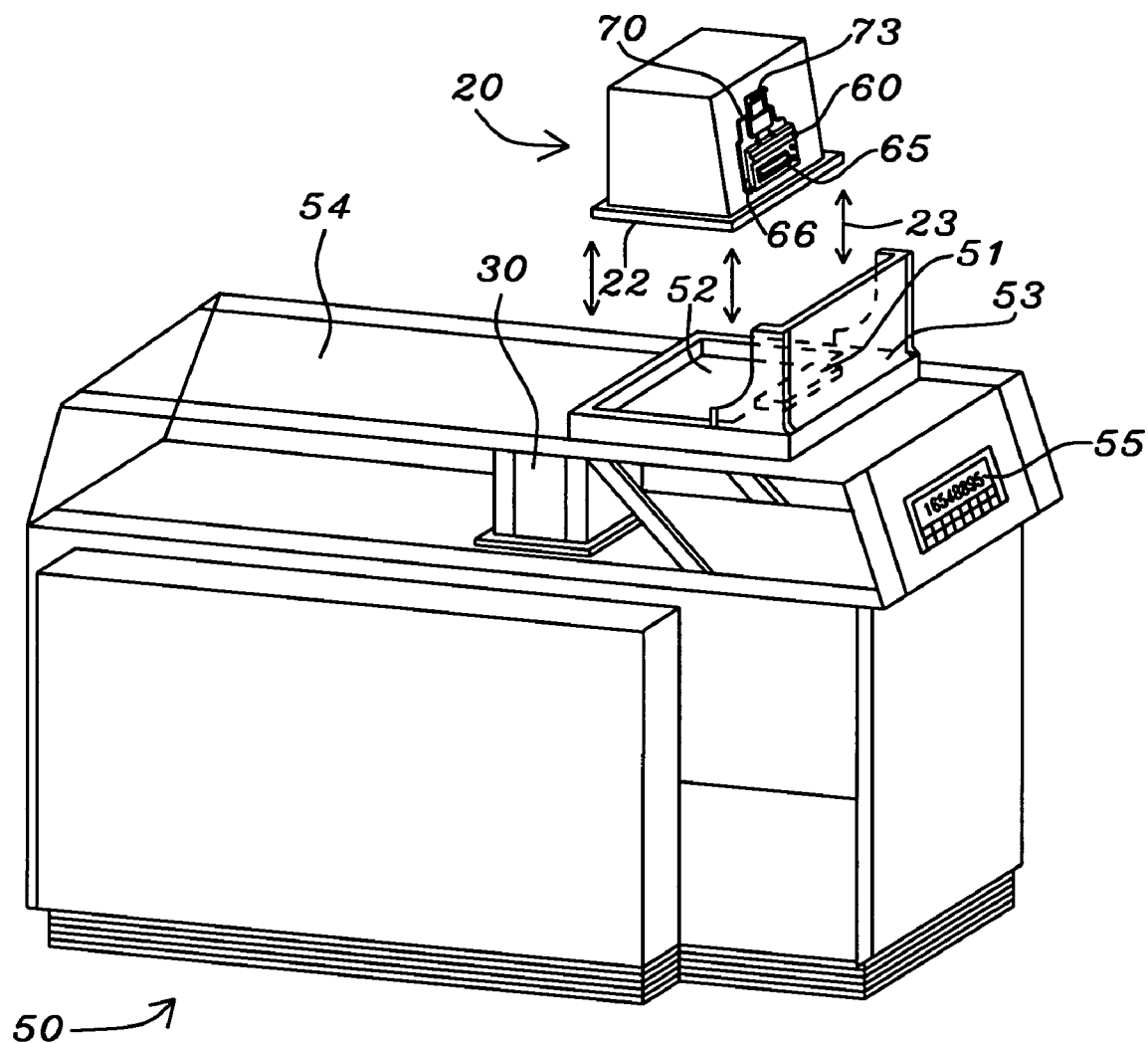
FIG. 5 is a perspective view illustrating a modular SMIF system with a SMIF pod and a dedicated smart tag according to the invention.

FIG. 5 illustrates the changes provided by the invention. Pod 20 is shown with the smart-tag package 60 of the invention, including interface plate 70 with bar-lock and wedge plate 73. The pod 20 is removably engaged on a canopy 54 of the workstation 50 shown by directional arrows 23. An engaging guide tray 66 aligns and seals the pod cassette port 22 disposed at the bottom of pod 20 over a canopy pass-through door 52 to the work station 50. The smart-tag 60 is adhesively affixed to pod 20 to interact with a two-way communication means 51 mounted on the work station canopy. The cassette 30 passes into the process station by way of a pass-through door 52 at the base of pod alignment tray, with door 53 on the interface ports on the canopies preserving the respective environments. Latches for the two doors are opened simultaneously so that any contamination on the surfaces of the outer doors are trapped between the doors, accordingly, preserving the clean environments of both pod and canopy into an integrated clean space. A mechanism lowers the two doors with the cassette 30. Latches release the pod door and the interface port simultaneously. An elevator mechanism lowers the two doors with the cassette riding on top into the canopy-covered space. A robot picks up the cassette and places it into a cassette port inside the equipment. After processing, the reverse operation is carried out.

While the invention has been particularly shown and described with reference to the preferred embodiments thereof, it will be understood by those skilled in the art that various changes in form and details may be made without departing from the spirit and scope of the invention.

What is claimed is:

1. A smart-tag holder assembly comprising:
   a housing for containing a data card, a microcomputer, a LCD and a two-way communication device;
   a retaining plate for mounting to a transportable carrier pod for carrying a plurality of semiconductor substrates; and
   a bar lock for removably attaching said housing to said retaining plate.

2. The smart-tag holder assembly of claim 1 wherein said housing includes a LCD window a battery compartment, and a compartment cover.

3. The smart-tag holder assembly of claim 2 wherein said compartment cover is a molded cover for securing battery connectivity and providing accessibility to replace spent batteries.

4. The smart-tag holder assembly of claim 1 wherein said housing is made from a thermoplastic material.

5. The smart-tag holder assembly of claim 1 wherein said data card stores records including pod contents, lot identification, lot status, process sequence, process work area and a pod cleaning schedule.

6. The smart-tag holder assembly of claim 1 further comprising a double-sided adhesive tape for mounting said plate to a side of said pod.

7. The smart-tag holder assembly of claim 1 wherein the housing, plate and bar lock limit access to removing the tag for cleaning and servicing reduces physical damage brought on by careless handling and abuse.

8. The smart-tag holder assembly of claim 1 wherein said bar lock is movable between a lock position and a unlock position.

9. The smart-tag holder assembly of claim 1 further comprising a key for locking said bar lock.

10. The smart-tag holder assembly of claim 1 wherein the housing includes an interlocking portion which is engaged by said bar lock.

11. The smart-tag holder assembly of claim 1 wherein the housing includes a rest pad and the plate includes a receiving pad for supporting the rest pad.

12. The smart-tag holder assembly of claim 1 wherein the plate includes a guide bearing housing for slidably retaining the bar lock to the plate.

13. A method for managing a transportable carrier pod for carrying a plurality of semiconductor substrates, the method comprising the steps of:
    providing a transportable carrier pod having a retaining plate mounted thereto;
    assigning a smart-tag to said transportable carrier pod for carrying said plurality of semiconductor substrates, the smart-tag comprising a data card, a microcomputer, a LCD and a two-way communication device;
    providing a bar lock;
    removably attaching said smart-tag to said retaining plate mounted to said transportable carrier pod, using said bar lock.

14. The method of claim 13 wherein said housing includes a LCD window a battery compartment, and a compartment cover.

15. The method of claim 14 wherein said compartment cover is a molded cover for securing battery connectivity and providing accessibility to replace spent batteries.

16. The method of claim 13 wherein said housing is made from a thermoplastic material.

17. The method of claim 13 wherein said data card stores records including pod contents, lot identification, lot status, process sequence, process work area and a pod cleaning schedule.

18. The method of claim 13 wherein said management includes pod cleaning management.

19. The method of claim 13 wherein said plate is mounted to a side of said Standard Mechanical Interface pod with a double-sided adhesive tape.

20. A system comprising:
    a transportable carrier pod for carrying a plurality of semiconductor substrates;
    a retaining plate mounted to the transportable carrier pod;
    a smart-tag; and
    a sliding bar lock for removably attaching the smart-tag to the retaining plate.

* * * * *